US007096551B2

(12) United States Patent
Lackowski, II

(10) Patent No.: US 7,096,551 B2
(45) Date of Patent: Aug. 29, 2006

(54) INSTALLATION TOOL FOR OIL AND GREASE SEALS

(75) Inventor: James F. Lackowski, II, Streamwood, IL (US)

(73) Assignee: SKF USA Inc., Elgin, IL (US)

( * ) Notice: Subject to any disclaimer, the term of this patent is extended or adjusted under 35 U.S.C. 154(b) by 208 days.

(21) Appl. No.: 10/845,455

(22) Filed: May 13, 2004

(65) Prior Publication Data

US 2005/0251982 A1 Nov. 17, 2005

(51) Int. Cl.
*B23P 19/02* (2006.01)

(52) U.S. Cl. .................................................... 29/235

(58) Field of Classification Search .................. 29/275, 29/235

See application file for complete search history.

(56) References Cited

U.S. PATENT DOCUMENTS 1,515,247 A * 11/1924 Forsyth ....................... 29/264
1,905,879 A 4/1933 Albertson
2,998,644 A 9/1961 Thill
3,604,096 A 9/1971 Shiroma
4,291,451 A * 9/1981 O'Neill et al. ................ 29/235
4,586,228 A * 5/1986 Rodolf ........................ 29/235
5,013,050 A 5/1991 Lansdale
5,052,695 A 10/1991 Curtis
5,528,809 A 6/1996 Green et al.
6,012,209 A 1/2000 Whetstone
6,282,768 B1 9/2001 Rapp
6,370,751 B1 4/2002 Rullmann et al.

* cited by examiner

*Primary Examiner*—Robert C. Watson
(74) *Attorney, Agent, or Firm*—Vedder Price Kaufman & Kammholz

(57) ABSTRACT

A tool for installing oil or grease seals. The tool includes a cup member with a driving handle at the top thereof. Various sizes of a seal installing member are provided and all have the same upper cylindrical portion with the lower cylindrical portion being of various sizes, depending on the seal with which it is to be used. The tool also includes a pair of extension sleeves, one with an internal rib and the other with an external rib for supporting the cylindrical portions of the sleeve and the installing part when assembled. Each of the second parts and the sleeves include locking pins or slots for receiving the locking pins. The working portion of the tool is the lower annular end face and the cup-like top portion includes a closed face on the top for supporting the tool or one of the extension sleeves.

12 Claims, 5 Drawing Sheets

INSTALLATION TOOL FOR OIL AND GREASE SEALS

BACKGROUND OF THE INVENTION

The present invention relates generally to tools for installing oil and grease seals, and more particularly, a tool which will effectively install a large variety of seals of various sizes.

The present invention is a useful tool for installing seals in a variety of sizes, but it is also adaptable to install seals using so-called stackable components, i.e., seal tools which may be extended axially prior to their use. The present invention operates on a simple principle, and particularly one where the axial dimension may be easily varied and simply manipulated. Typically, the tool allows installation not only of ordinary seals, but also seals wherein axial extension lips or other extensions cause the seal to be installed over protruding shafts.

Likewise, there are provided various adaptor rings that will accommodate seals ranging from about one-half an inch to 5 inches in diameter, or perhaps even longer. The seals also are designed to accommodate the exclusion features or extended dirt lips on the oil seals, or to provide secondary seals against radial flanges, etc. The tool is designed with a nesting feature, to accommodate a driving force, and one in which the two-component tool includes a closed end wall which receives a handle adapted for driving the seal, one or more pins to secure the component and also includes a second component which may be received in the first component by a simple twist lock operation. Thereafter, the second component presents an abutting end face against the closed end portion of the first component so that the driving force may be applied to the cup and then to the second component without damage to the pins holding the components together.

In addition to this configuration, the tool may also include a pair of extension sleeves. The first sleeve nests within the cup with the second cylindrical component nesting in the first extension sleeve. Then the driving tool fits within the second extension sleeve. The driven tool or second component comes in a wide variety of sizes, any one of which fits readily into the first or driving tool component. Each of the driven components includes a short axial slot and a short circumferential slot, thus making the twist lock operation the ultimate in simplicity and reliability.

Accordingly, it is an object of the invention to provide a simple, multi-component tool for installing oil or grease seals.

It is another object of the invention to provide a tool for installing a seal wherein a first component includes a driving handle located centrally of the closed end of this first component.

Another object of the invention is to provide a variety of second components which may be interchangeably used with the first component.

A still further object of the invention is to provide a series of second components, each of which includes a simple twist lock device and each of which includes an annular end face which is adapted to rest on the end face of the closed end portion of the cup or first member.

A still further object of the invention is to provide a series of stackable components, in this case two, for example, containing respectively outer and inner shoulders and each of which contains a twist lock, whereby the stackable components may be placed adjacent the cup, and whereby the second component of the tool may optionally fit within the stacking rings to provide extra axial space of both for allowing protruding shafts to extend therethrough or for allowing the seal to have an extended dirt lip or the like.

A further object of the invention is to provide a tool having a variety of second components, which may be sold to the purchaser in any number, but need also be sold only with one, two or a smaller number of second components, depending on the needs of the user.

A still further object of the invention is to provide a seal installing tool wherein the user may order one or more subsequent second components as his needs require.

The manner in which these and other objects and advantages of the invention are achieved in practice is by providing a seal installing tool which includes a cup like first member having a flat, closed end portion and means for accommodating a handle thereon, and a pair of sidewalls with an annular end face and at least one locking pin, a second component having a pair of parallel, spaced apart sidewalls and two annular end faces, one for each end, and at least one slot for engaging a locating pin, and optionally one or more pairs of additional cylindrical components which extend the reach of the cylindrical installation tool as desired.

The manner in which these and other objects of the invention are achieved and practiced will become more clearly apparent when reference is made to the following detailed description of the invention set forth by way of example and shown in the accompanying drawings in which like reference numbers indicate corresponding parts throughout.

DESCRIPTION OF THE PREFERRED EMBODIMENT OF THE INVENTION

While the invention is capable of being practiced in certain variations of the preferred embodiment, a description of such preferred embodiment will now be given.

Figure 1:
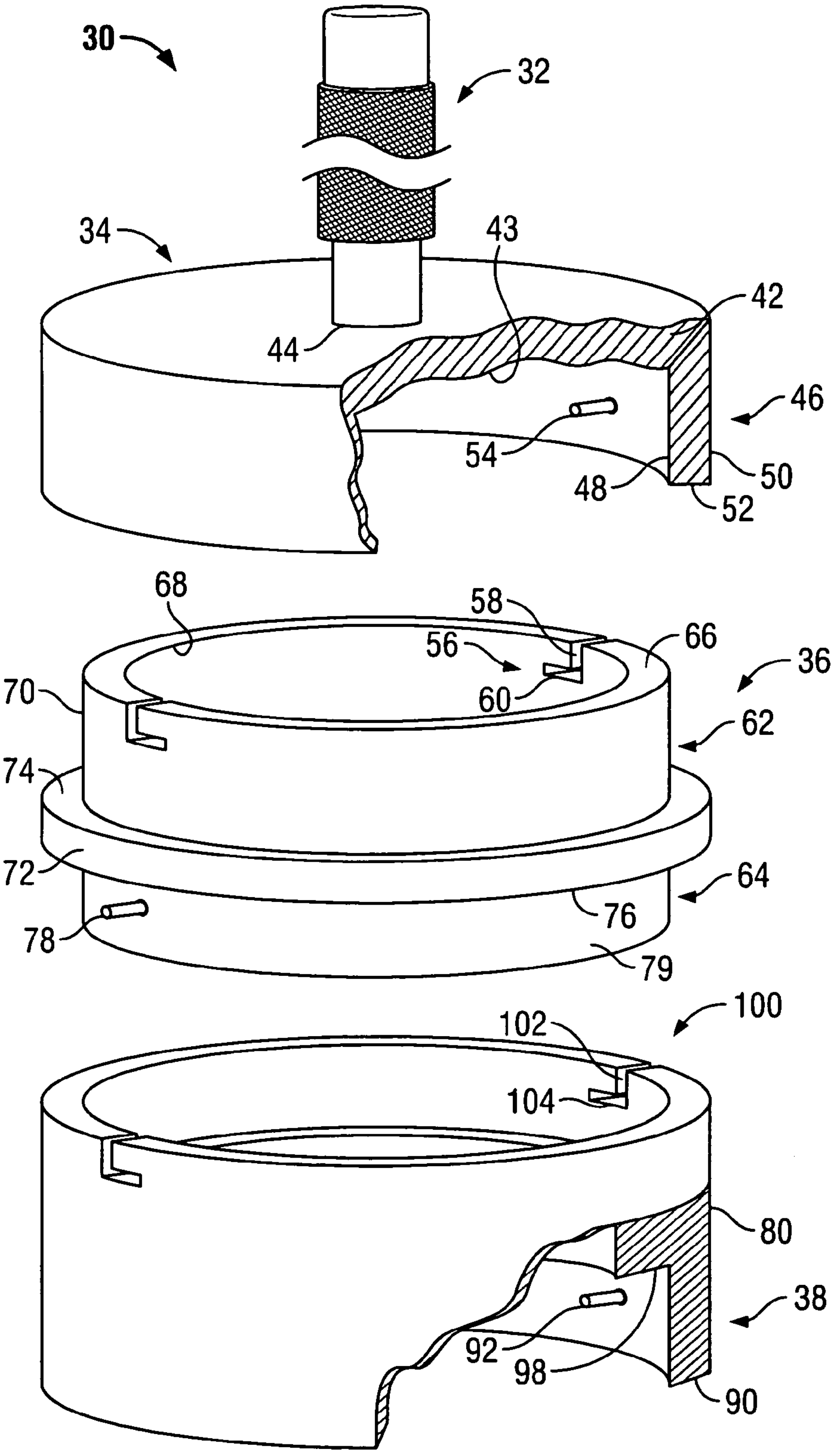
FIG. 1 is an exploded perspective view of one form of the first component of the invention, showing the handle installed in the first component and showing two extension rings for mating with the first component and for being received over a shaft that extends out from a housing containing the seal.
Figure 1A:
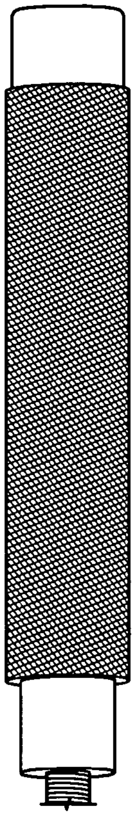
FIG. 1A is a perspective view of the driving handle.

Referring now the drawings in greater detail, there is shown in FIG. 1, an exploded form of a tool generally designated 30 having a handle generally designated 32 inserted into an opening in a first component or cup generally designated 34 of the tool 30. The cup 34 is shown exploded but it will ultimately be associated in one embodiment of the invention with an upper sleeve generally designated 36 and a lower sleeve generally designated 38.

Figure 8:
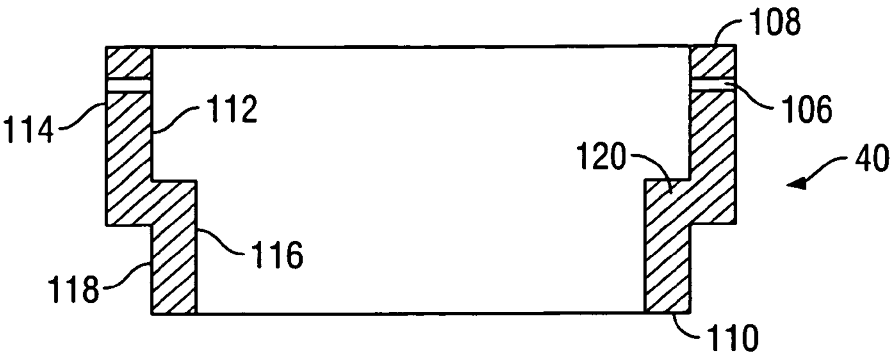
Figure 9:
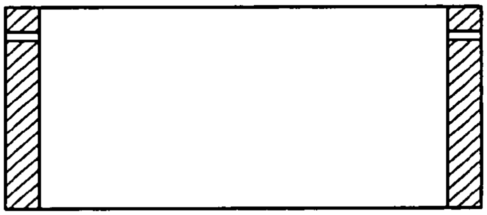
Figure 10:
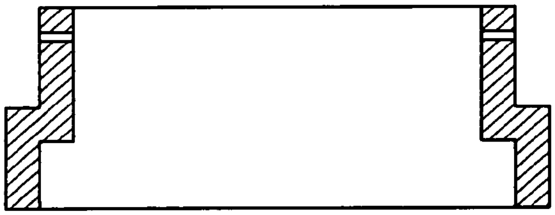
Figure 11:
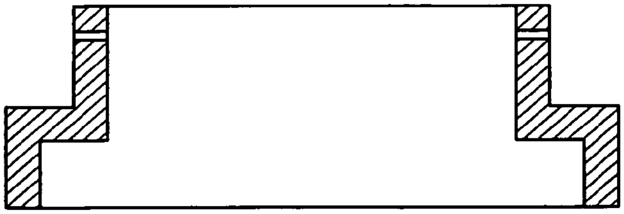
Figure 12:
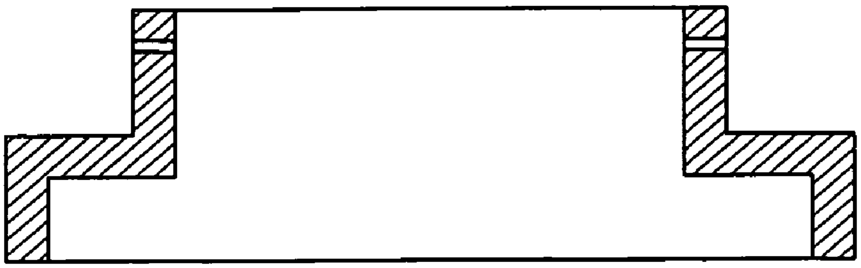

Referring now to FIG. 8, for example, one of a number of second components generally designated 40 is shown. Referring again to FIGS. 1–3, the cup generally designated 34 is shown to comprise a closed end wall 42 with a flat inner annular facing surface 43, and is shown to have a tapped opening 44 centrally therein.

Figure 2:
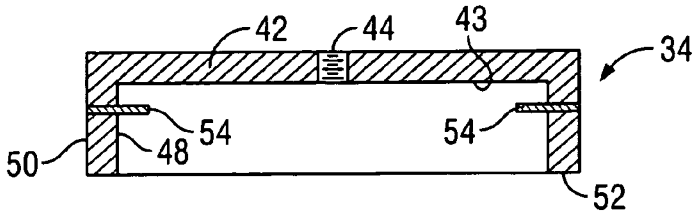
FIG. 2 is a vertical sectional view of the cup-like first component of the tool of the invention, showing the threaded opening for receiving the handle and a pair of locking pins extending radially inwardly therefrom.
Figure 3:
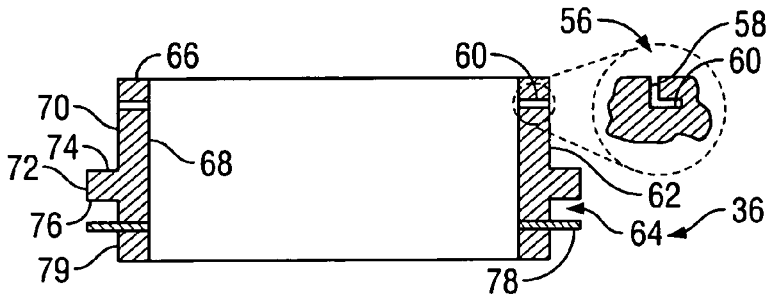
FIG. 3 is a vertical sectional view of a cylindrical extension sleeve including an exterior shoulder thereon for registering with the end face of the cup-like first component, and a pair of locking pins.

An axially extending side wall generally designated 46 is defined by inner and outer side wall surfaces 48, 50 and by a flat annular end face surface 52. As shown in FIGS. 1 and 2, a pair of locking pins 54 extends inwardly from the inner side wall surface 48. The locking pin 54 is designed to engage a slot generally designated 56, with axial and partly circumferential segments 58, 60 formed in an upper portion of the upper sleeve generally designated 36.

The upper sleeve 36 includes an upper segment generally designated 62 and a lower segment generally designated 64. The upper segment 62 is defined by an annular end face surface 66 and axially extending inner and outer side walls 68, 70.

A radially outwardly extending flange 72 lies between upper and lower annular surfaces 74, 76. The lower segment 64 includes a locking pin 78 which extends radially outwardly from the lower cylindrical surface 79.

Figure 4:
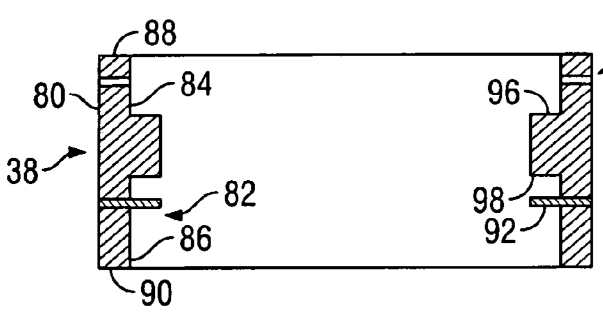
FIG. 4 is a vertical sectional view of a second extension sleeve adapted to fit over the first extension sleeve and including an interior shoulder and a pair of locking pins.
Figure 5:
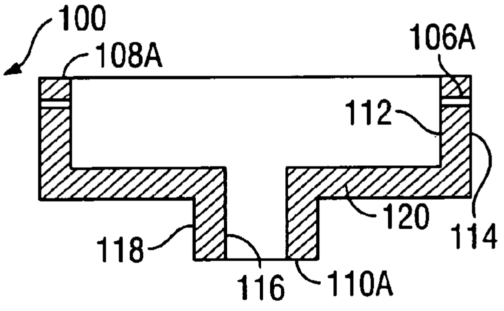
FIG. 5 is a vertical sectional view of one form of second component of the installation tool, showing it being adapted to be slid into and mate with the first component, or alternatively, with the second extension sleeve component.
Figure 6:
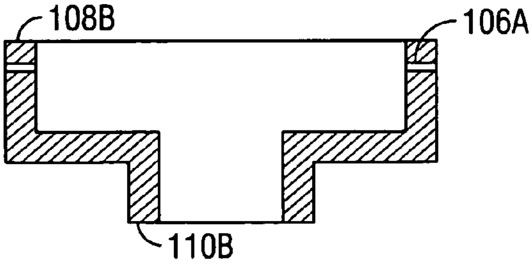
FIG. 6 through FIG. 12 inclusive, show respective second components of the tool adapted to install different respective sizes of seal.
Figure 7:
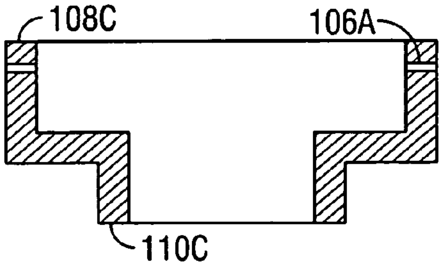

Referring now to the lower sleeve 38, this generally cylindrical unit includes an outer side wall 80 which is continuous and a discontinuous inner side wall generally designated 82 (FIG. 4) comprised of upper and lower segments 84, 86 with opposed annular end faces 88, 90. The lower surface 86 includes an inwardly extending locking pin 92 and an internal rib 94 defined by top and bottom annular surfaces 96, 98. The upper, inner cylindrical surface 84 includes a locking slot or cutout generally designated 100 with axial and circumferential slots 102, 104 defining these surfaces (FIG. 1).

Referring now to FIGS. 1, 4, and 5–7, the locking pin 92 is adapted to mate with any one of a number of slots 106A, 106B, etc. having the same elements as the slot 56, including the axial and circumferential slots 58, 60. The second component includes upper and lower annular end faces 108, 110 and inner and outer upper cylindrical surfaces 112, 114 as well as lower, inner and outer cylindrical surfaces 116, 118, and in this case, a radial offsetting flange 120.

It will be understood that the seal engaging part 40 shown in FIG. 8, which is also referred to herein and in the claims as the second component, is only one of several second components, all of which are adapted to mate with either the cup generally designated 46, or with the pair of cylindrical extensions ending with the lower extension 38. Consequently, the seal installing elements shown in FIGS. 5–12 respectively all include upper, annular end faces 108, 108A, 108B, etc., which are adapted to engage the flange surface 98 on the lower cylindrical extension or the upper surface 42 of the first component 34. The only difference in any of these second components is the size of their lower end faces 110, 110A, 110B, etc.

Figure 13:
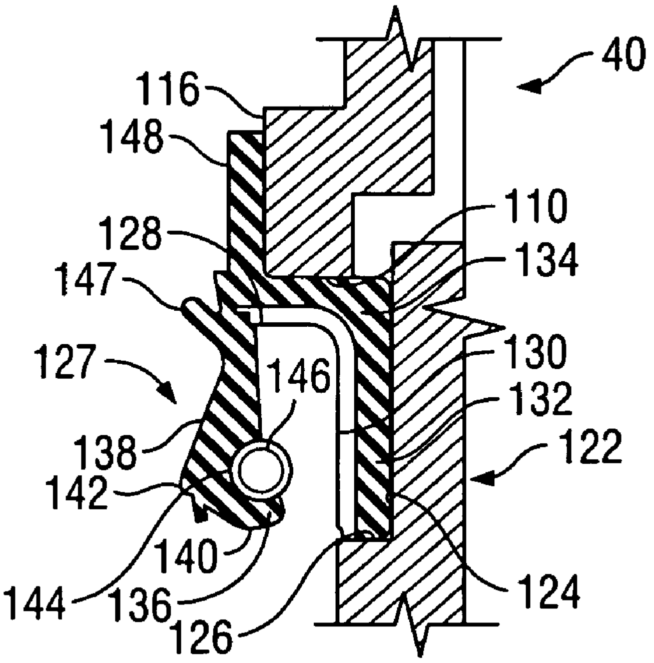
FIG. 13 is a fragmentary sectional view showing a machine part, a seal with an extended dirt lip and one of the tools used to install a seal in an associated seal counterbore.

Referring now to FIG. 13, there is shown a housing generally designated 122, and having an axially extending counterbore 124 with a depth limiting end face 126. An oil seal generally designated 127 includes a seal casing having radially and axially extending flanges 128, 130. A rubber outside diameter sleeve 132 which is integral with a rubber end face 134 characterizes this particular seal. The seal also includes a primary lip body 136 and includes, for example, air and oil side surfaces 138, 140, meeting along a generally circular locus to form a seal band 142 of intended contact with a shaft (not shown).

The seal may also include a groove 144 for receiving and retaining a garter spring 146. In this case, the seal 127 further includes a dirt lip 147 and axially extending tail piece 148. The tail piece 148 engages the inner surface 116 of the second component 40 while the rubber end face 134 is engaged by the annular end face 110 of the second component 40.

Installing a seal with the aid of the tool is the ultimate in simplicity. The handle 32 is inserted into the upper piece 34 and screwed into the upper piece with a tight fit. Next, an appropriate size of second piece 40 is selected, and this piece 40 is inserted and locked in place by a twisting motion whereby the slot 106 engages the locking pin 54. This is done with a simple twist of the two parts relative to each other.

Next, a seal having, for example, a tail piece 148 is placed within the interior 116 of the lower piece 40, and it achieves a snug fit therein, with the heel or annular surface 100 engaging the radially extending end face 134 of the seal 127. The tool and seal combination then insert the seal in the counterbore 124, with there being initially a slight interference between the rubber o.d. 132 and the counterbore 124. Thereafter, continued application of force through the handle 32 and the remainder of the tool elements 34, 40 installs the seal until the seal "bottoms out" against the end face 126 of the counterbore 124.

If the application has a shaft that protrudes out of the counterbore a substantial distance, extension rings or sleeves are used. The first extension ring is inserted into the cup 34 and twist-locked into place. Then the lower sleeve is inserted, using the walls 90, and the rib 98 and the locking pin 92. The surfaces 52, 74, the surfaces 88, 76, and the surfaces 90, 108 (FIG. 8) respectively engage each other. Then, a seal is inserted as just described.

Figure 14:
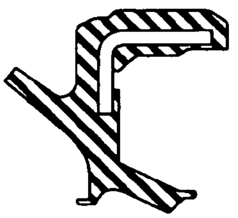
FIG. 14 through FIG. 22 are vertical cross-sectional views of various kinds of seals, including those which have an extended dirt or other lip and which are suitable to be installed with the tool shown in FIG. 1.
Figure 15:
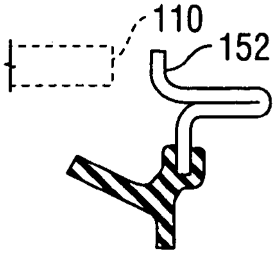
Figure 16:
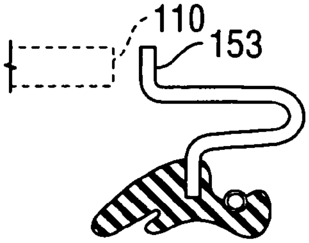
Figure 20:
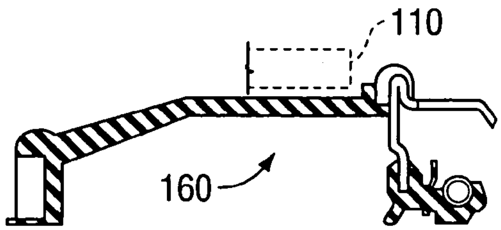
Figure 21:
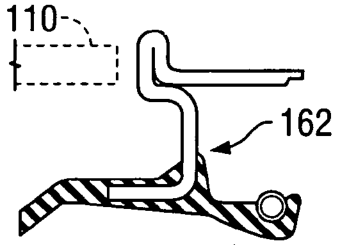
Figure 22:
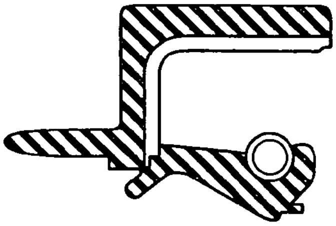

A few forms of seal are shown in FIGS. 14–22. FIG. 22 illustrates the seal shown in FIG. 13. The seal shown in FIG. 14 is similar, except the tail piece 150 is more sharply angled. This tail piece is simply compressed enough to fit within the inserting piece 40. FIGS. 15 and 16 show seals wherein the faces 110 of the tool 40 rest on the outer diameter flange of the stamping or seal casing 152, 153.

Figure 17:
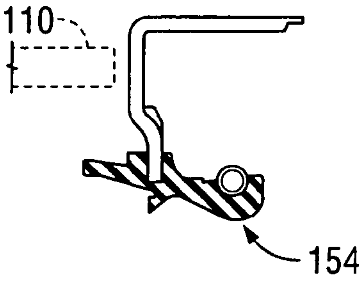
Figure 18:
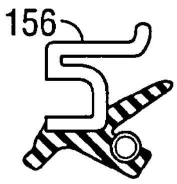

FIG. 17 shows the tool annular face 110 in relation to the seal 154. FIG. 18 shows a type of seal 156 having a convoluted casing.

Figure 19:
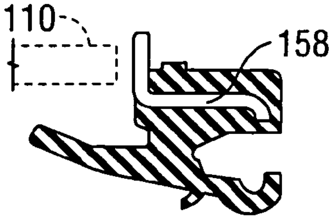

FIG. 19 shows a seal 158 with a very accessible stamping or casing. FIG. 20 shows a seal with a very extended dirt lip 160 which would definitely require the extension sleeves of the invention. FIG. 21 shows a seal 162 with another form of dirt lip and using the inventive tool for installation. Other forms of seal, of course, may also be installed using the tool of the invention.

It will thus be seen that the present invention provides a novel tool having a number of advantages and characteristics including those herein pointed out and otehrs which are inherent in the invention.

The invention claimed is:

1. A tool for installing a variety of contoured oil seals in a variety of applications, each application having a right circular cylindrical counter bore of a given inside diameter for receiving a shaft seal, said seal having an elastomeric portion and an embedded metal stiffener therein and presenting an annular end surface of a given size to be engaged by said tool, said tool being a multi-component tool having a first component including a closed end wall with means therein for receiving a drive handle and a pair of right circular cylindrical sidewall surface of given first and second inside and outside diameters respectively and joined by a first flat annular end face surface, at least one locking pin extending inwardly from said first inside diameter sidewall surface, and, nested within said first component, one of several second components each presenting respectively a second flat annular end face defined by third and fourth inner and outer diameter sidewall surfaces, and a third annular end face defined by fifth and sixth inner and outer diameter sidewall surfaces, and at least one locking slot in said second component, said locking slot having a vertical segment intersecting said second annular end face and having a horizontal segment for engaging said locking pin, said second annular end face abutting the first flat annular end face surface of said closed end wall, and said third annular end face surface abutting said end face of said given size on said seal.

2. A tool as defined in claim 1 wherein said tool also includes a pair of extension sleeves, said extension sleeves comprising a first part and a second part, said first part having a pair of annular end faces and an external rib disposed between said faces, and an upper slot for receiving a locking pin and a rib on its interior, an upper, locking pin receiving slot and a lower, inwardly extending locking pin, said second part having a pair of annular end faces, an internal rib, an upper slot for receiving a locking pin and a lower locking pin extending inwardly therefrom, whereby said first and second parts may be locked together and inserted between said first and second components thereby forming an extension sleeve for said components.

3. A tool as defined in claim 1 wherein said means for receiving a drive handle comprises a tapped center opening in said first component.

4. A tool as defined in claim 1 wherein said at least one locking pin comprises two or more locking pins and said at least one locking slot comprises at least two locking slots.

5. A tool as defined in claim 1 wherein there are two locking pins on said first component and two locking slots on said second component.

6. A tool as defined in claim 2 wherein said at least one locking pin comprises two or more locking pins and said at least one locking slot comprises at least two locking slots.

7. A tool as defined in claim 1 wherein said locking slots each comprise an axial opening and a circumferential opening, whereby a twisting motion locks said pin into said opening.

8. A tool for installing a variety of oil seals in a variety of applications, each seal having an elastromeric portion and a metal stiffener embedded therein, each application having a cylindrical counterbore of a given diameter for receiving a given seal, a shaft of smaller given outside diameter over which said seal is installed, said seal presenting a working margin to be engaged by said tool, said tool being a multi-component tool having a first component comprising a continuous cylindrical sidewall of a first inside diameter, a closed end wall portion having means therein for receiving a handle, at least one locking pin mounted on and extending radially inwardly from said cylindrical side wall, and an annular end face for engaging a of said second component, and plural second parts, each of said second parts having one end smaller by a working clearance only than said first inside diameter, said one end extending into said first component and having at least one opening registering with said locking pin and its other end having a cylindrical sidewall of a given outside diameter for pushing said seals into said cylindrical counterbore, said other end having an inside diameter greater than the outside diameter of said shaft, said other end also presenting a working margin for engaging said seal.

9. A tool as defined in claim 8 wherein said means for receiving a drive handle comprises a tapped center opening in said first component.

10. A tool as defined in claim 8 wherein there are two locking pins on said first component and two locking slots on, said second component.

11. A tool as defined in claim 8 wherein said locking slots each comprise an axial opening and a circumferential opening, whereby a twisting motion locks said pin into said opening.

12. A tool for installing a variety of oil seals in a variety of applications, each application having a cylindrical counterbore of a given diameter for receiving a given shaft seal, having an elastomeric portion and an embedded metal stiffener, a shaft of smaller given diameter over which said seal is to be installed, said seal presenting a working margin to be engaged by said tool, said tool being a multi-component tool having a first component comprising a continuous cylindrical sidewall defining an opening of a first inside diameter, a closed end wall portion having means therein for receiving a handle, and at least one locking pin mounted on and extending radially inwardly from said cylindrical side wall, and plural second parts, each second part having a continuous circular sidewall with one end having an outside diameter smaller by a working clearance only than said first inside diameter, said one end extending into said opening in said sidewall of said first component and abutting said closed end wall, and having a slot registering with said locking pin, and the other end of said second component having an inside diameter greater than the outside diameter of said shaft, said other end presenting a working margin adapted to engage said working margin of said seal.

* * * * *